(12) United States Patent
Oh et al.

(10) Patent No.: US 7,068,893 B2
(45) Date of Patent: Jun. 27, 2006

(54) OPTICAL FIBER COMPOSITE ELECTRICAL POWER CABLE

(75) Inventors: Duk-Jin Oh, Gyeonggi-do (KR); Young-Gug Kwun, Gyeongsanbuk-do (KR); In-Ho Lee, Gyeongsanbuk-do (KR); Seok-Hyun Nam, Gyeonggi-do (KR); Su-Kil Lee, Gyeonggi-do (KR); Jae-Yong Jung, Gyeonggi-do (KR); Hye-Won Lee, Gyeonggi-do (KR)

(73) Assignee: LG Cable Ltd., Seoul (KR)

( * ) Notice: Subject to any disclaimer, the term of this patent is extended or adjusted under 35 U.S.C. 154(b) by 0 days.

(21) Appl. No.: 10/839,369

(22) Filed: May 4, 2004

(65) Prior Publication Data

US 2005/0123254 A1    Jun. 9, 2005

(30) Foreign Application Priority Data

Dec. 3, 2003  (KR) ...................... 10-2003-0087362

(51) Int. Cl.
*G02B 6/44* (2006.01)
(52) U.S. Cl. ...................... 385/101; 385/102; 385/104; 385/113
(58) Field of Classification Search ......... 385/100–114
See application file for complete search history.

(56) References Cited

U.S. PATENT DOCUMENTS

| | | | | |
|---|---|---|---|---|
| 4,787,705 A | * | 11/1988 | Shinmoto et al. | ........... 385/104 |
| 4,867,527 A | | 9/1989 | Dotti et al. | ............... 350/96.23 |
| 6,195,488 B1 | * | 2/2001 | Song | ........................... 385/101 |
| 6,496,627 B1 | * | 12/2002 | Tuminaro | .................... 385/102 |
| 6,546,176 B1 | * | 4/2003 | Anderson et al. | ........... 385/113 |
| 6,567,591 B1 | * | 5/2003 | Hoch | ......................... 385/107 |
| 2004/0105634 A1 | * | 6/2004 | Bosisio et al. | .............. 385/100 |

FOREIGN PATENT DOCUMENTS

| | | |
|---|---|---|
| JP | 02-144810 | 6/1990 |
| JP | 06-148001 | 5/1994 |
| JP | 06-181013 | 6/1994 |
| JP | 06-181014 | 6/1994 |
| JP | 06-181015 | 6/1994 |
| KR | 2003-45864 | 6/2003 |

* cited by examiner

*Primary Examiner*—Sung Pak
*Assistant Examiner*—Tina M Wong
(74) *Attorney, Agent, or Firm*—Jones Day

(57) ABSTRACT

An underground power cable having an optical fiber sensor for measuring temperature distribution is disclosed. In the power cable, an optical fiber for measuring temperature distribution is received in a stainless steel tube having excellent strength, and this optical tube is interposed between a core and a sheath of the power cable. When arranging the optical tube in the power cable, a supporting material having a relatively low strength than the optical tube is arranged in the cable together in order to prevent the optical fiber from being damaged by external force and prevent the inner insulation layer from being broken down by the optical tube. In addition, a fixing tape for fixing the optical tube in contact with the core may be added to prevent the optical tube from being bent seriously or inclined to one side when the cable is bent.

5 Claims, 3 Drawing Sheets

OPTICAL FIBER COMPOSITE ELECTRICAL POWER CABLE

BACKGROUND OF THE INVENTION

1. Field of the Invention

The present invention relates to an underground power cable for transmitting electric power with being laid under the ground, and more particularly to an underground power cable having an optical fiber sensor for measuring distributed temperature of the cable.

2. Description of the Related Art

Generally, an underground power cable shows increase of temperature when electric current is supplied thereto, and an ampacity is calculated on the basis of a maximum temperature that the underground power cable may endure. Thus, while operating the underground power cable, it is very important to measure temperature of the underground power cable which is applying an electric current. However, since measuring the temperature of the conductor is substantially impossible while the underground power cable is applying an electric current, an optical fiber for measurement of temperature is generally used.

Korean Patent Laid-open Publication No. 2003-45864 discloses, as an example, a system for calculating temperature of a conductor of the underground power cable while a temperature measuring optical fiber is mounted in the cable.

In addition, there have been reported various power cable structures including an optical fiber in a power cable for temperature measurement or data transmission. For example, Japanese Patent Laid-open Publication No. 1990-144810 suggests a cable in which an optical fiber is arranged in a shielding layer or a cable jacket (or, a protective layer) of a power cable. Japanese Patent Laid-open Publication Nos. 1994-148001, 1994-181013, 1994-181014 and 1994-181015 disclose a cable in which an optical fiber is arranged in the shielding layer to a longitudinal direction.

U.S. Pat. No. 4,867,527 also discloses a composite power cable in which an optical duct containing an optical fiber is laid in a protective layer.

However, such conventional composite power cables have some technical problems as follow.

The optical fiber may be easily damaged since its mechanical strength is very weak. Thus, the optical fiber is received and protected in a tube (or, a pipe) having great strength and small radius of curvature. However, if the optical fiber is protected in the tube, the tube having small radius of curvature and great strength may damage an insulation layer, thereby deteriorating its insulating strength.

In addition, if the optical fiber or the optical duct is installed on an outer semi-conductive layer of the composite power cable, the optical fiber or duct is not fixed but movable in the power cable. In this case, the optical fiber or duct may be bent or inclined to one side more than its design optimum, so the temperature of a desired region cannot be accurately measured.

SUMMARY OF THE INVENTION

The present invention is designed to solve the problems of the prior art, and therefore it is an object of the present invention to provide a composite power cable configured so that it may not damage an insulating material in the cable despite using an optical duct with a small radius of curvature and a great strength.

Another object of the invention is to provide a composite power cable which is capable of stably fixing an optical fiber or an optical unit for measurement of temperature so that the optical fiber or unit is not bent nor inclined to one side more than its design optimum.

In order to accomplish the above object, the present invention provides an optical fiber composite power cable including a core having a central conductor and at least one semi-conductive layer and insulation layer for surrounding the central conductor, and a sheath positioned around the core for protecting the core, in which the composite power cable includes at least one optical unit interposed between the core and the sheath so as to be extended in a longitudinal direction of the cable with spirally winding around the core, wherein the optical unit includes an optical duct having at least one optical fiber therein; and at least one supporting wire positioned adjacent to the optical duct for protecting the optical duct and the core against external force.

At this time, the sheath may include a metal sheath layer for surrounding the optical unit and the core; and a protective layer for surrounding the metal sheath layer.

Alternatively, the sheath may include a fixing tape for fixing the optical unit to an outer circumference of the core by surrounding the optical unit; a metal sheath layer for surrounding the fixing tape and the core; and a protective layer for surrounding the metal sheath layer.

At this time, the fixing tape is preferably either a semi-conductive tape or an insulation tape.

As another aspect of the invention, there is also provided an optical fiber composite power cable which includes a core having a central conductor and at least one semi-conductive layer and insulation layer for surrounding the central conductor; at least one optical unit extended in a longitudinal direction of the cable to spirally wind around the core; at least one metal wire extended in the longitudinal direction of the cable to spirally wind around the core together with the optical unit with being spaced apart from the optical fiber; a plastic protective layer coated on the optical unit and the metal wire, wherein the optical unit includes: an optical duct having at least one optical fiber therein; and at least one supporting wire positioned adjacent to the optical duct for protecting the optical duct and the core against external force.

As another aspect of the invention, there is also provided an optical fiber composite power cable which includes a core having a central conductor and at least one semi-conductive layer and insulation layer for surrounding the central conductor; a first fixing tape for surrounding the core in a longitudinal direction of the cable; at least one optical unit extended in the longitudinal direction of the cable to spirally wind around the first fixing tape; a second fixing unit for fixing the optical unit to the core by surrounding the optical unit and the core in the longitudinal direction of the cable; a metal sheath layer for surrounding the second fixing tape; and a plastic protective layer coated on the metal sheath layer, wherein the optical unit includes an optical duct having at least one optical fiber therein; and at least one supporting wire positioned adjacent to the optical duct for protecting the optical duct and the core against external force.

As another aspect of the invention, there is also provided an optical fiber composite power cable which includes a core having a central conductor and at least one semi-conductive layer and insulation layer for surrounding the central conductor; at least one optical unit extended in a longitudinal direction of the cable to spirally wind around the core; at least one metal wire extended in the longitudinal direction of the cable to spirally wind around the core together with the optical unit with being spaced apart from the optical fiber; a fixing tape for fixing the optical unit and the metal wire to the core by surrounding the optical unit and the metal wire; and a plastic protective layer coated on the fixing tape, wherein the optical unit includes an optical duct having at least one optical fiber therein; and at least one supporting wire positioned adjacent to the optical duct for protecting the optical duct and the core against external force.

The supporting wire is preferably contacted with the optical duct, and more particularly two supporting wires are contacted with both opposite surfaces of the optical duct, respectively.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Figure 1:
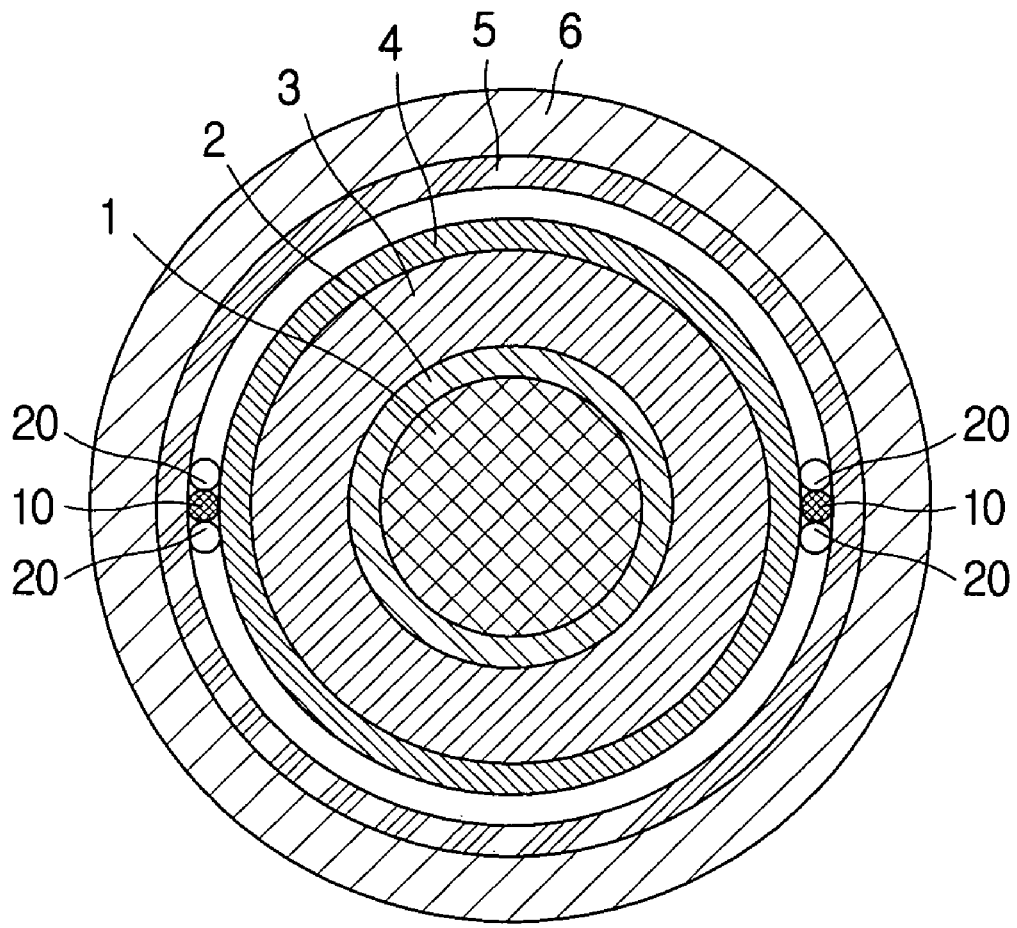
FIG. 1 is a sectional view showing a composite power cable according to the first embodiment of the present invention.

Hereinafter, the present invention will be described in more detail referring to the drawings.

Embodiment 1

FIG. 1 is a sectional view showing an optical fiber composite power cable according to the first embodiment of the present invention. Referring to FIG. 1, the cable includes a core 1, 2, 3 and 4 positioned at the center of the cable, a sheath 5 and 6 coated around the core, and optical units 10 and 20 interposed between the core and the sheath.

The core includes a central conductor 1, an inner semi-conductive layer 2 coated on the outer circumference of the central conductor 1, an insulation layer 3 coated on the outer circumference of the inner semi-conductive layer 2, and an outer semi-conductive layer 4 coated on the outer circumference of the insulation layer 3.

The central conductor 1 guides current supplied from a transformer substation to be transmitted to electric equipments, and the semi-conductive layers 2 and 4 play a role of preventing concentration of high electric field while high voltage is applied to the conductor. In addition, the insulation layer 3 prevents dielectric breakdown.

Figure 2:
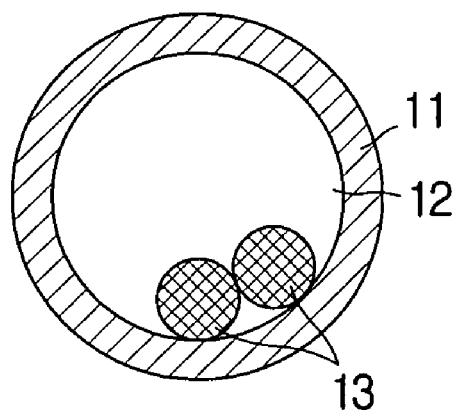
FIG. 2 is a sectional view showing an optical duct according to the present invention.

The optical unit 10 and 20 includes an optical duct 11 containing at least one optical fiber 13, and at least one supporting wire 20 positioned adjacent to the optical duct 11 for preventing the optical duct 11 from being damaged by external force or preventing the insulation layer 3 of the core from being broken down due to the optical duct 11, as shown in FIG. 2.

The optical duct 11 is extended in a longitudinal direction of the cable and is preferably a tube made of stainless steel in which one or more optical fiber 13 is loosely received. The optical fiber acts as a sensor for measuring distributed temperature of the cable by means of OTDR (Optical Time Domain Reflectometry). The principle of measuring the distributed temperature using the optical fiber is well disclosed in U.S. Pat. No. 4,838,690.

In addition, a gap between the optical duct 11 and the optical fiber 13 is preferably filled with a filler 12.

The supporting wire 20 is preferably made of a wire having lower strength than the optical duct 11 in order to prevent the optical duct 11 from damage. For example, if the optical duct 11 is made of stainless steel, the supporting wire 20 is preferably made of plastic or paper with lower strength than stainless steel. In particular, the supporting wire 20 is more preferably a paper string.

The supporting wire 20 may be arranged either spaced apart from the optical duct 11 as much as a predetermined distance or adjacent to the optical duct 11. More preferably, two supporting wires 20 are arranged in contact with both opposite sides of the optical duct 11 as shown in FIG. 1.

Between the core and the sheath of the cable, one or more optical unit 10 and 20 may be interposed. The optical unit 10 and 20 is preferably extended in the longitudinal direction of the cable with winding around the core 1, 2, 3 and 4. When the optical unit 10 and 20 spirally winds the outer semi-conductive layer 4 as described above, the radius of curvature of the optical unit is increased, thereby preventing the inside of the power cable from being damaged by the optical unit.

The sheath 5 and 6 includes a metal sheath layer (or, a metal shielding layer) 5 coated on the outer circumference of the outer semi-conductive layer 4 spirally wound by the optical unit 10 and 20, and a protective layer 6 coated on the metal sheath layer 5. The metal sheath layer 5 may be made of an aluminum sheath, a copper sheath, a stainless steel sheath, a lead sheath or the like. Particularly, a corrugated aluminum sheath or a lead sheath is most preferred. In addition, the protective layer 6 is formed by extruding plastic material such as polyethylene upon the metal sheath layer 5.

As mentioned above, when the supporting wire is positioned adjacent to the optical duct receiving optical fibers, it is possible to prevent the optical duct from being damaged by external force and prevent the insulation layer from being damaged by the optical duct. In addition, since the optical unit having the supporting wire spirally winds around the core of the cable, external force applied to the optical unit may be dispersed toward the outer circumference.

Embodiment 2

Figure 3:
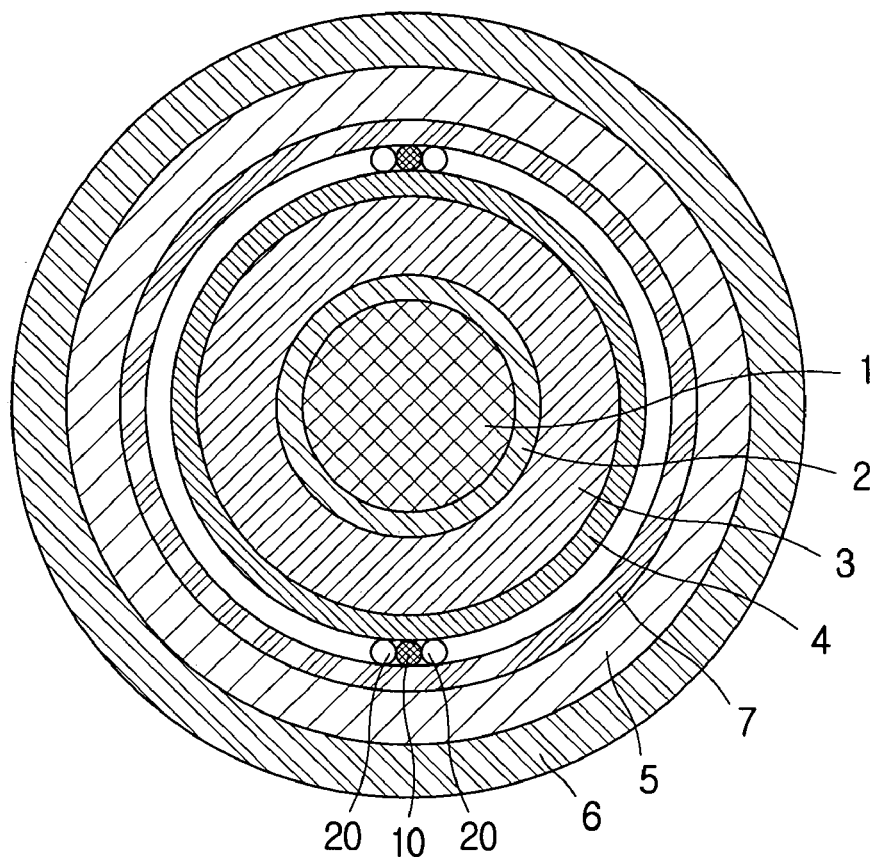
FIG. 3 is a sectional view showing a composite power cable according to the second embodiment of the present invention.

FIG. 3 is a sectional view showing an optical fiber composite power cable according to the second embodiment of the present invention. This embodiment is similar to the former embodiment in the fact that the cable includes the core 1, 2, 3 and 4, the sheath 5, 6 and 7 coated on the core, and the optical unit 10 and 20 interposed between the core and the sheath. Particularly, the core 1, 2, 3 and 4 and the optical unit 10 and 20 show no difference, compared with the first embodiment. However, detailed configuration of the sheath 5, 6 and 7 is different from the first embodiment as follows.

The sheath of this embodiment further includes a fixing tape 7 in addition to the metal sheath layer 5 and the protective layer 6. This fixing tape 7 plays a role of fixing the optical unit 10 and 20 to the outer semi-conductive layer 4 of the core. As for the fixing tape 7, a semi-conductive tape or an insulation tape may be adopted. Particularly, in case the metal sheath layer 5 is a corrugated aluminum pipe, using the fixing tape 7 is strongly preferred since there occurs a gap between the core and the sheath of the cable.

If the optical unit is fixed to the core using the fixing tape as described above, it is possible to prevent the optical unit from being seriously bent or inclined to one side though the cable undergoes a bending behavior.

Embodiment 3

Figure 4:
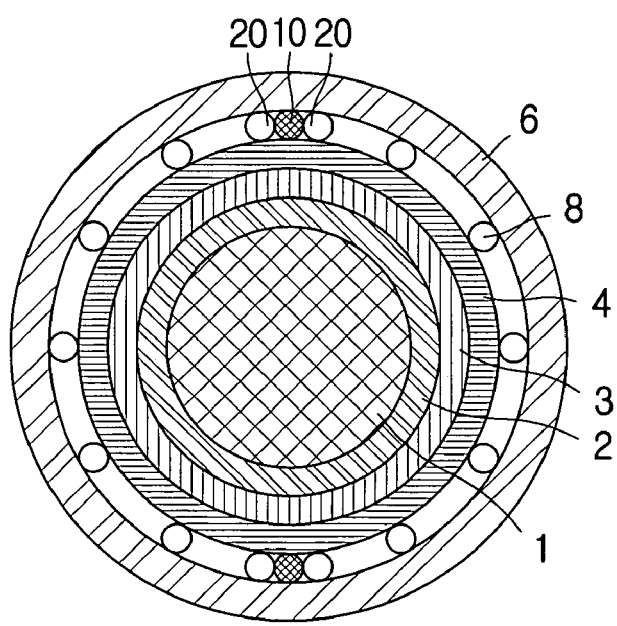
FIG. 4 is a sectional view showing a composite power cable according to the third embodiment of the present invention.

FIG. 4 is a sectional view showing an optical fiber composite power cable according to the third embodiment of the present invention. This embodiment is also similar to the first embodiment in the fact that the cable includes the core 1, 2, 3 and 4, the sheath 6 and 8 coated on the core, and the optical unit 10 and 20 interposed between the core and the sheath. Particularly, the core 1, 2, 3 and 4 and the optical unit 10 and 20 show no difference, compared with the first embodiment. However, detailed configuration of the sheath 6 and 8 is different from the first embodiment as follows.

The sheath of this embodiment includes at least one metal wire 8 extended in the longitudinal direction of the cable with spirally winding around the outer semi-conductive layer 4 of the core, and a plastic protective layer 6 coated on the metal wire layer 8.

Referring to FIG. 4, a wire 8 made of copper or aluminum is received in a space for receiving optical fibers out of the core 1, 2, 3 and 4, separately from the optical unit 10 and 20. This copper or aluminum wire 8 is extended in the longitudinal direction of the cable with spirally winding around the outer semi-conductive layer 4 of the core together with the optical unit 10 and 20.

Embodiment 4

Figure 5:
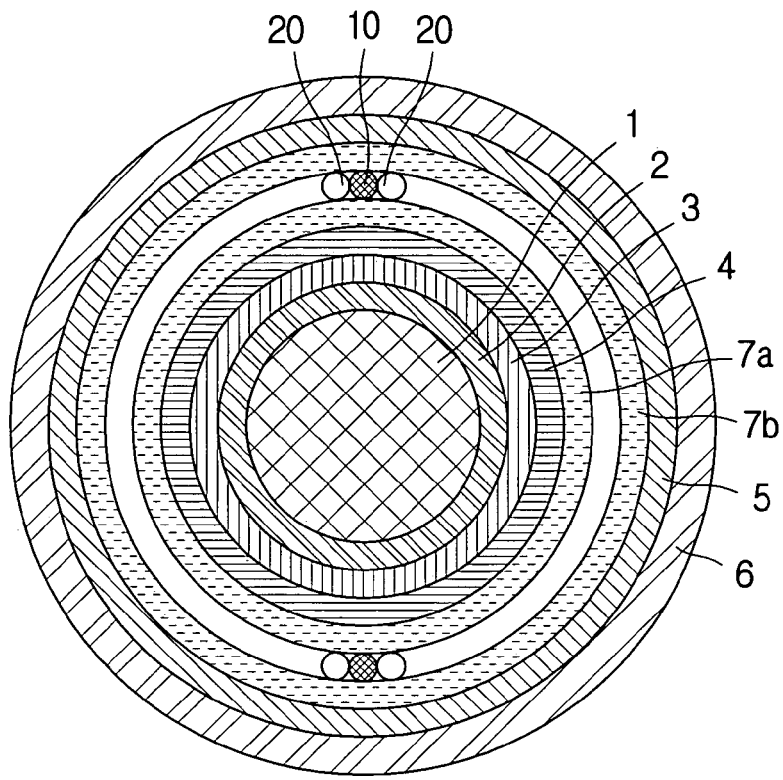
FIG. 5 is a sectional view showing a composite power cable according to the fourth embodiment of the present invention.

FIG. 5 is a sectional view showing an optical fiber composite power cable according to the fourth embodiment of the present invention. This embodiment is also similar to the first embodiment in the fact that the cable includes the core 1, 2, 3 and 4 positioned at the center of the cable, the sheath 5 and 6 coated on the core, and the optical unit 10 and 20 interposed between the core and the sheath. Particularly, the core 1, 2, 3 and 4, the sheath 5 and 6, and the optical unit 10 and 20 are substantially identical to those of the first embodiment. However, the present embodiment is different from the first embodiment in the fact that the composite power cable of this embodiment further includes first and second fixing tapes 7a and 7b between the core 1, 2, 3 and 4 and the optical unit 10 and 20 and between the optical unit 10 and 20 and the sheath 5 and 6.

Referring to FIG. 5, the first fixing tape 7a surrounds the outer semi-conductive layer 4 of the core, while the optical unit 10 and 20 spirally winds around the first fixing tape 7a. In addition, the second tape 7b surrounds the spirally-wound optical unit 10 and 20, and then the metal sheath layer 5 is coated on the second fixing tape 7b.

The first and second fixing tapes 7a and 7b may employ the same material as the fixing tape of the second embodiment.

Embodiment 5

Figure 6:
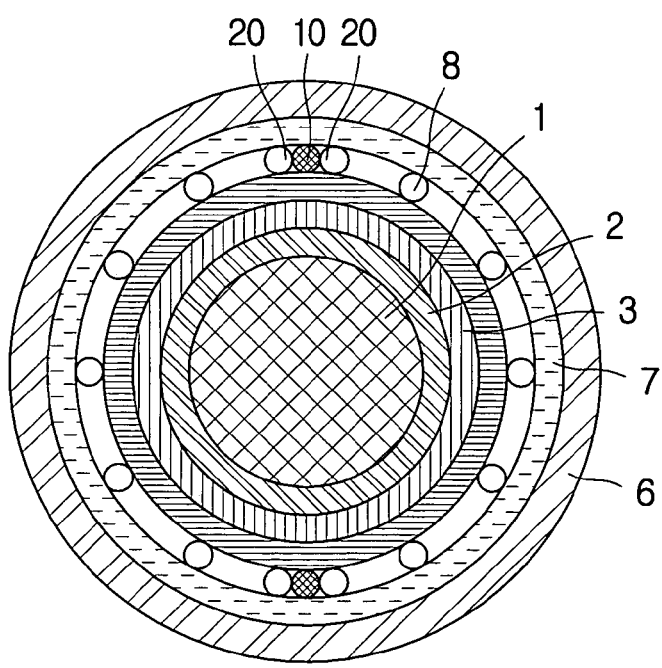
FIG. 6 is a sectional view showing a composite power cable according to the fifth embodiment of the present invention.

FIG. 6 is a sectional view showing an optical fiber composite power cable according to the fifth embodiment of the present invention. This embodiment is also similar to the first embodiment in the fact that the cable includes the core 1, 2, 3 and 4, the sheath 6 and 8 coated on the core, and the optical unit 10 and 20 interposed between the core and the sheath. Particularly, the core 1, 2, 3 and 4 and the optical unit 10 and 20 show no difference, compared with the first embodiment.

However, this embodiment is particularly configured so that a plurality of metal wires 8 spirally wind around the outer semi-conductive layer 4 of the core together with the optical unit 10 and 20, a fixing tape 7 surrounds the optical unit 10 and 20 and the metal wires 8 to be fixed to the core 1, 2, 3 and 4, and a plastic protective layer 6 is coated on the fixing tape 7.

Referring to FIG. 6, a copper or aluminum wire 8 is interposed in the optical unit receiving space out of the core 1, 2, 3 and 4, separately from the optical unit 10 and 20. This copper or aluminum wire 8 is extended in the longitudinal direction of the cable with spirally winding around the outer semi-conductive layer 4 of the core together with the optical unit 10 and 20.

In order to fix the spirally-wound optical unit 10 and 20 and the metal wires 8, a semi-conductive tape or an insulation tape is surrounded around them, and the protective layer 6 is formed by extruding plastic around this fixing tape 7.

Terms and words used in the specification and the claims should be interpreted not in a limited normal or dictionary meaning, but to include meanings and concepts conforming with technical aspects of the present invention, based on the fact that inventors may appropriately define a concept of a term to describe his/her own invention in a best way.

Therefore, the configurations described in the specification and drawn in the figures are just most preferred embodiments of the present invention, not to show all of the technical aspects of the present invention. So, it should be understood that there might be various equalities and modifications to be replaced with them.

APPLICABILITY TO THE INDUSTRY

According to the present invention, it is possible to prevent damage of optical fibers and breakdown of an inner insulation layer by positioning support materials in the power cable together with the optical fiber tube (or, the optical duct) containing an optical fiber used for measuring temperature of the cable.

In addition, since the optical fiber tube is securely fixed to the core of the cable by means of a fixing tape, the optical fiber tube is not bent seriously nor inclined to one side when the cable is bent.

What is claimed is:

1. An optical fiber composite power cable including a core having a central conductor and at least one semi-conductive layer and insulation layer for surrounding the central conductor, and a sheath positioned around the core for protecting the core, the composite power cable comprising:

at least one optical unit interposed between the core and the sheath so as to be extended in a longitudinal direction of the cable with spirally winding around the core, wherein the optical unit includes:

an optical duct which is a tube made of stainless steel and has at least one optical fiber therein; and at least one supporting wire having strength smaller than that of the optical duct and positioned adjacent to the optical duct for protecting the optical duct and the core against external force.

2. An optical fiber composite power cable according to claim 1, wherein the tube is filled with a filler.

3. An optical fiber composite power cable including a core having a central conductor and at least one semi-conductive layer and insulation layer for surrounding the central conductor, and a sheath positioned around the core for protecting the core, the composite power cable comprising:
   at least one optical unit interposed between the core and the sheath so as to be extended in a longitudinal direction of the cable with spirally winding around the core,
   wherein the optical unit includes:
      an optical duct having at least one optical fiber therein; and
      at least one supporting wire which is a paper string or a plastic wire having strength smaller than that of the optical duct and positioned adjacent to the optical duct for protecting the optical duct and the core against external force.

4. An optical fiber composite power cable including a core having a central conductor and at least one semi-conductive layer and insulation layer for surrounding the central conductor, and a sheath positioned around the core for protecting the core, the composite power cable comprising:
   at least one optical unit interposed between the core and the sheath so as to be extended in a longitudinal direction of the cable with spirally winding around the core,
   wherein the optical unit includes:
      an optical duct having at least one optical fiber therein; and
      at least one supporting wire positioned adjacent to the optical duct for protecting the optical duct and the core against external force, and wherein the sheath includes:
      a fixing tape for fixing the optical unit on an outer circumference of the core by surrounding the optical unit and the core;
      a metal sheath layer for surrounding the fixing tape; and
      a protective layer for surrounding the metal sheath layer.

5. An optical fiber composite power cable according to claim 4, wherein the fixing tape is a semi-conductive tape or an insulation tape.

* * * * *